(12) United States Patent
Handa et al.

(10) Patent No.: US 10,756,366 B2
(45) Date of Patent: Aug. 25, 2020

(54) FUEL CELL SYSTEM AND FUEL CONSUMPTION SYSTEM

(71) Applicant: HONDA MOTOR CO., LTD., Tokyo (JP)

(72) Inventors: Kiyoshi Handa, Utsunomiya (JP); Satoshi Kawasaki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 485 days.

(21) Appl. No.: 15/236,041

(22) Filed: Aug. 12, 2016

(65) Prior Publication Data

US 2016/0351924 A1 Dec. 1, 2016

Related U.S. Application Data

(63) Continuation of application No. 14/203,864, filed on Mar. 11, 2014, now abandoned.

(30) Foreign Application Priority Data

Mar. 14, 2013 (JP) ................................. 2013-052025

(51) Int. Cl.
*H01M 8/04082* (2016.01)
*B60K 15/03* (2006.01)
(Continued)

(52) U.S. Cl.
CPC ... *H01M 8/04201* (2013.01); *B60K 15/03006* (2013.01); *B60L 3/00* (2013.01);
(Continued)

(58) Field of Classification Search
None
See application file for complete search history.

(56) References Cited

U.S. PATENT DOCUMENTS 7,210,341 B2 5/2007 Fuse
2005/0247123 A1* 11/2005 Fuse .................. G01F 15/0755
73/290 R (Continued)

FOREIGN PATENT DOCUMENTS

JP 2006-208133 A 8/2006
JP 2010-236657 A 10/2010
(Continued)

OTHER PUBLICATIONS

German Office Action Application No. 102014204441.3 dated Nov. 27, 2014. per MPEP 609. submitted in parent U.S. Appl. No. 14/203,864.

(Continued)

*Primary Examiner* — Zhongqing Wei
(74) *Attorney, Agent, or Firm* — Squire Patton Boggs (US) LLP

(57) ABSTRACT

A fuel cell system and a fuel consumption system verify the location of a filling failure at a time that a fuel gas filling process suffers from such a filling failure. Either one of encoded data indicating an infrared radiation signal related to the fuel gas filling process, which is sent from a vehicle to an external hydrogen station, and a drive signal, which comprises a train of binary pulses converted from the encoded data, is recorded in a recording unit of the vehicle.

7 Claims, 13 Drawing Sheets

(51) Int. Cl.
    *F17C 5/06*     (2006.01)
    *H01M 8/04992*     (2016.01)
    *H01M 8/04664*     (2016.01)
    *B60L 3/04*     (2006.01)
    *B60L 3/00*     (2019.01)
    *B60L 3/12*     (2006.01)
    *B60L 50/72*     (2019.01)
    *B60L 53/30*     (2019.01)
    *B60L 53/60*     (2019.01)
    *B60L 53/50*     (2019.01)

(52) U.S. Cl.
    CPC ............... *B60L 3/0053* (2013.01); *B60L 3/04* (2013.01); *B60L 3/12* (2013.01); *B60L 50/72* (2019.02); *B60L 53/30* (2019.02); *B60L 53/50* (2019.02); *B60L 53/60* (2019.02); *F17C 5/06* (2013.01); *H01M 8/04686* (2013.01); *H01M 8/04992* (2013.01); *B60K 2015/03203* (2013.01); *B60K 2015/03315* (2013.01); *F17C 2201/056* (2013.01); *F17C 2201/058* (2013.01); *F17C 2205/037* (2013.01); *F17C 2205/0364* (2013.01); *F17C 2221/012* (2013.01); *F17C 2221/033* (2013.01); *F17C 2223/0123* (2013.01); *F17C 2227/04* (2013.01); *F17C 2250/032* (2013.01); *F17C 2250/034* (2013.01); *F17C 2250/043* (2013.01); *F17C 2250/0439* (2013.01); *F17C 2260/023* (2013.01); *F17C 2265/065* (2013.01); *F17C 2270/0178* (2013.01); *F17C 2270/0184* (2013.01); *H01M 2250/20* (2013.01); *Y02E 60/321* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/32* (2013.01); *Y02T 90/34* (2013.01); *Y10T 137/7287* (2015.04)

(56) References Cited

U.S. PATENT DOCUMENTS

| | | |
|---|---|---|
| 2012/0000574 A1 | 1/2012 | Nishiumi |
| 2012/0113773 A1 | 5/2012 | Matsuo et al. |
| 2012/0125482 A1 | 5/2012 | Mori |

FOREIGN PATENT DOCUMENTS

| | | |
|---|---|---|
| JP | 2010-236673 A | 10/2010 |
| JP | 2011-33068 A | 2/2011 |
| JP | 2011-094652 A | 5/2011 |
| JP | 2011-106583 A | 6/2011 |
| JP | 2012-077789 A | 4/2012 |
| JP | 2012-150666 A | 8/2012 |
| JP | 5029855 B2 | 9/2012 |
| JP | 5138760 B2 | 2/2013 |

OTHER PUBLICATIONS

Japanese Office Action Application No. 2013-052025 dated Jan. 6, 2015. per MPEP 609. submitted in parent U.S. Appl. No. 14/203,864.

\* cited by examiner

FUEL CELL SYSTEM AND FUEL CONSUMPTION SYSTEM

CROSS-REFERENCE TO RELATED APPLICATIONS

This application is a continuation of U.S. patent application Ser. No. 14/203,864, filed on Mar. 11, 2014, which claims priority to Japanese Patent Application No. 2013-052025 filed on Mar. 14, 2013. The contents of these prior applications are incorporated herein by reference in their entirety.

BACKGROUND OF THE INVENTION

Field of the Invention

The present invention relates to a fuel cell system and a fuel consumption system. In such a fuel cell system, e.g., a fuel cell vehicle, or such a fuel consumption system, e.g., a hydrogen engine vehicle or a CNG (Compressed Natural Gas) vehicle, a fuel storage unit such as a gas tank or the like disposed in the system is filled with a fuel gas from an external fuel gas supply apparatus such as a gas station or the like for storing the fuel gas in the fuel storage unit, and thereafter the fuel gas stored in the fuel storage unit is consumed, by way of reaction or combustion, in order to generate and utilize energy.

Description of the Related Art

Fuel cells such as solid polymer electrolyte fuel cells operate in the following manner. A fuel gas, such as a hydrogen-containing gas, which is supplied to an anode electrode, is ionized by an electrode catalyst into hydrogen ions. The hydrogen ions then move through an appropriately humidified electrolyte membrane to a cathode electrode. Electrons, which are generated while the hydrogen ions move from the anode electrode to the cathode electrode, are supplied to an external circuit, which makes use of the electrons as DC electric energy. Since the cathode electrode is supplied with an oxygen-containing gas such as air, the cathode electrode allows the hydrogen ions, the electrons, and the oxygen to react with each other, thereby producing water.

Fuel cell vehicles have been proposed, which are propelled by an electric motor energized by an energy source including electric energy generated by a fuel cell and electric energy stored in an electric energy storage device.

Hydrogen engine vehicles and CNG vehicles have also been proposed, which are propelled by an engine which operates in such a manner that a fuel gas is injected into the engine and combusted in order to rotate a crankshaft. Rotational energy of the crankshaft is shifted in speed through a transmission, and transmitted to enable the vehicles to travel.

Fuel cell systems such as fuel cell vehicles or the like and fuel consumption systems such as hydrogen engine vehicles or the like preferably include a fuel storage unit such as a gas tank or the like, which can be filled up completely with a fuel gas in a single fuel filling process.

Japanese Laid-Open Patent Publication No. 2011-033068 (hereinafter referred to as "JP2011-033068A") discloses a gas filling system. The disclosed gas filling system operates in the following manner. When a fuel gas supply apparatus supplies a fuel gas to fill a system-side fuel storage unit, a system-side filling control unit, also referred to as a filling ECU (Electronic Control Unit), sends information concerning characteristics of the fuel storage unit as well as the temperature and pressure in the fuel storage unit through a system-side communication unit to the fuel gas supply apparatus via an infrared communications link. Such information is sent at the time that the fuel gas starts to fill the fuel storage unit, as well as while the fuel gas is filling the fuel storage unit, i.e., during the fuel gas filling process.

The fuel gas supply apparatus receives the information concerning the characteristics of the fuel storage unit as well as the temperature and pressure in the fuel storage unit, determines a filling rate, etc., based on the received information, and continues to fill the fuel storage unit with the fuel gas.

If the filling ECU detects that a filling failure has occurred, e.g., if the temperature in the system-side fuel storage unit is unduly high, then the fuel gas supply apparatus, which has received information concerning the detected temperature, etc., performs a control process in order to lower the filling rate based on the received information, and then continues to fill the fuel storage unit while the temperature in the fuel storage unit is prevented from increasing further (see paragraphs [0012], [0015], [0017], and [0025] of JP2011-033068A).

SUMMARY OF THE INVENTION

Upon detection of a filling failure, e.g., in a case where the temperature in the system-side fuel storage unit is unduly high, there is a demand for a verifying or analyzing process, which is carried out in order to judge whether the filling failure has occurred in the system side or the fuel gas supply apparatus side, so as to enable the location of the filling failure to be identified.

However, nothing is disclosed in JP2011-033068A concerning such a verifying or analyzing process for judging whether a filling failure has occurred in the system side or the fuel gas supply apparatus side, so as to enable the location of the filling failure to be identified.

It is an object of the present invention to provide a fuel cell system and a fuel consumption system, which is capable of performing a verifying or analyzing process in order determine the location of a filling failure in the event of such a filling failure.

According to the present invention, there is provided a fuel cell system comprising a fuel cell, a fuel storage unit for storing a fuel gas that is supplied to the fuel cell, a storage internal state detector for detecting an internal state of the fuel storage unit, a transmitter for sending a signal related to a fuel gas filling process to an external fuel supply source when the external fuel supply source fills the fuel storage unit with the fuel gas, and a controller having an information processor, which is supplied with a detected value detected by the storage internal state detector, and which processes information sent to the external fuel supply source based on the detected value, and a drive signal generator for converting data processed by the information processor into a drive signal for the transmitter, wherein the controller has a recording unit in which there is recorded at least one of the data processed by the information processor and the drive signal generated by the drive signal generator.

According to the present invention, data representing the signal related to the fuel gas filling process and the drive signal converted from the data are sent from the fuel cell system (the system side) to the exterior, and at least one of such data is recorded in the recording unit of the controller of the fuel cell system. Consequently, in the event of a filling failure, it is possible to determine whether the filling failure has occurred in either the fuel cell system or the external fuel supply source, by checking whether or not the information represented by the signal related to the fuel gas filling process, which was sent from the fuel cell system to the exterior, is abnormal, based on the recording contents recorded in the recording unit. Therefore, it is possible to verify and analyze the location of the filling failure.

Irrespective of whether or not a filling failure was detected, the controller may continuously record at least one of the data and the drive signal in the recording unit, or may record at least one of the data and the drive signal in the recording unit if the information processor detects a filling failure based on the detected value. In the case that the controller records at least one of the data and the drive signal in the recording unit only if the controller detects a filling failure, the storage unit (memory) of the recording unit can have a small storage capacity.

Instead of recording at least one of the data and the drive signal in the recording unit of a filling controller, which serves as a controller for controlling the fuel gas filling process, at least one of the data processed by the information processor of the filling controller and the drive signal generated by the drive signal generator of the filling controller may be recorded in a recording unit of a recording controller, which is linked with the filling controller.

According to the present invention, the storage unit of the recording unit of the filling controller can be eliminated, and thus the size and cost of the filling controller can be reduced.

In this case, if the recording controller has a time grasping function, then the recording controller may record the data and the drive signal in relation to time, thereby making the recorded data and the recorded drive signal more reliable.

Preferably, the external fuel supply source includes a fuel supply apparatus for supplying fuel gas to the fuel storage unit, the fuel supply apparatus having a supply-side receiver for receiving the signal related to the fuel gas filling process sent from the transmitter on the side of the fuel storage unit, and a fuel-supply-side transmitter combined with the fuel supply apparatus, for emitting, to the exterior, a signal related to the fuel gas filling process when the fuel supply apparatus supplies the fuel gas to the fuel storage unit, wherein the fuel cell system further comprises a receiver for receiving the signal sent from the fuel-supply-side transmitter.

With the above arrangement, the controller of the fuel cell system can record the signal, which is sent from the fuel-supply-side transmitter and received by the receiver, in the recording unit. Further, the recording controller of the fuel cell system can record the signal, which is sent from the fuel-supply-side transmitter and received by the receiver. Therefore, when a filling failure occurs, it can be identified with precision whether the filling failure has occurred in the fuel cell system or in the fuel supply apparatus, thereby making it possible to verify and analyze the location of the filling failure with greater accuracy.

According to the present invention, at least one of data representing the signal related to the fuel gas filling process and the drive signal converted from such data is recorded on the system side, and/or the signal transmitted from the fuel-supply-side transmitter and received by the receiver of the fuel cell system is recorded on the system side. In addition to or independently of the above process, at least one of data representing the signal related to the fuel gas filling process and the drive signal converted from such data may be recorded in a recording unit of the fuel supply apparatus side, and/or the signal transmitted from the system-side transmitter and received by a receiver of the fuel supply apparatus side may be recorded in the recording unit of the fuel supply apparatus side.

Furthermore, each of the above-identified inventions can be applied to a fuel consumption system that comprises a fuel consumption apparatus.

According to the present invention, at least one of data representing the signal related to the fuel gas filling process and the drive signal converted from such data, which are sent from the system side to the external fuel supply source side, is recorded in the recording unit of the system side. Consequently, in the event of a filling failure, based on at least one of the data and the drive signal recorded in the recording unit, it is possible to identify whether the filling failure has occurred in the system or the external fuel supply source. Therefore, it is possible to verify and analyze the location of the filling failure.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Preferred embodiments of the present invention will be described in detail below with reference to the drawings.

A fuel cell system, such as a fuel cell vehicle or the like, and a fuel consumption system, such as a hydrogen engine vehicle or a CNG vehicle or the like, serve as part of a communication filling system, which supplies a fuel gas from an external fuel gas supply source (fuel supply source) in order to fill a system-side fuel storage unit of the fuel cell system or the fuel consumption system while performing communications and information-exchange with the fuel supply source. The communication filling system comprises a filling line (gas passage) for supplying the fuel gas, and a communication line for performing the aforementioned communications and information-exchange by interconnecting the fuel supply source together with the fuel cell system or the fuel consumption system, which includes the system-side fuel storage unit therein. Communication filling systems, which include a fuel cell system or a fuel consumption system according to first through fourth embodiments of the present invention, will be described in specific detail below.

First Embodiment

Figure 1:
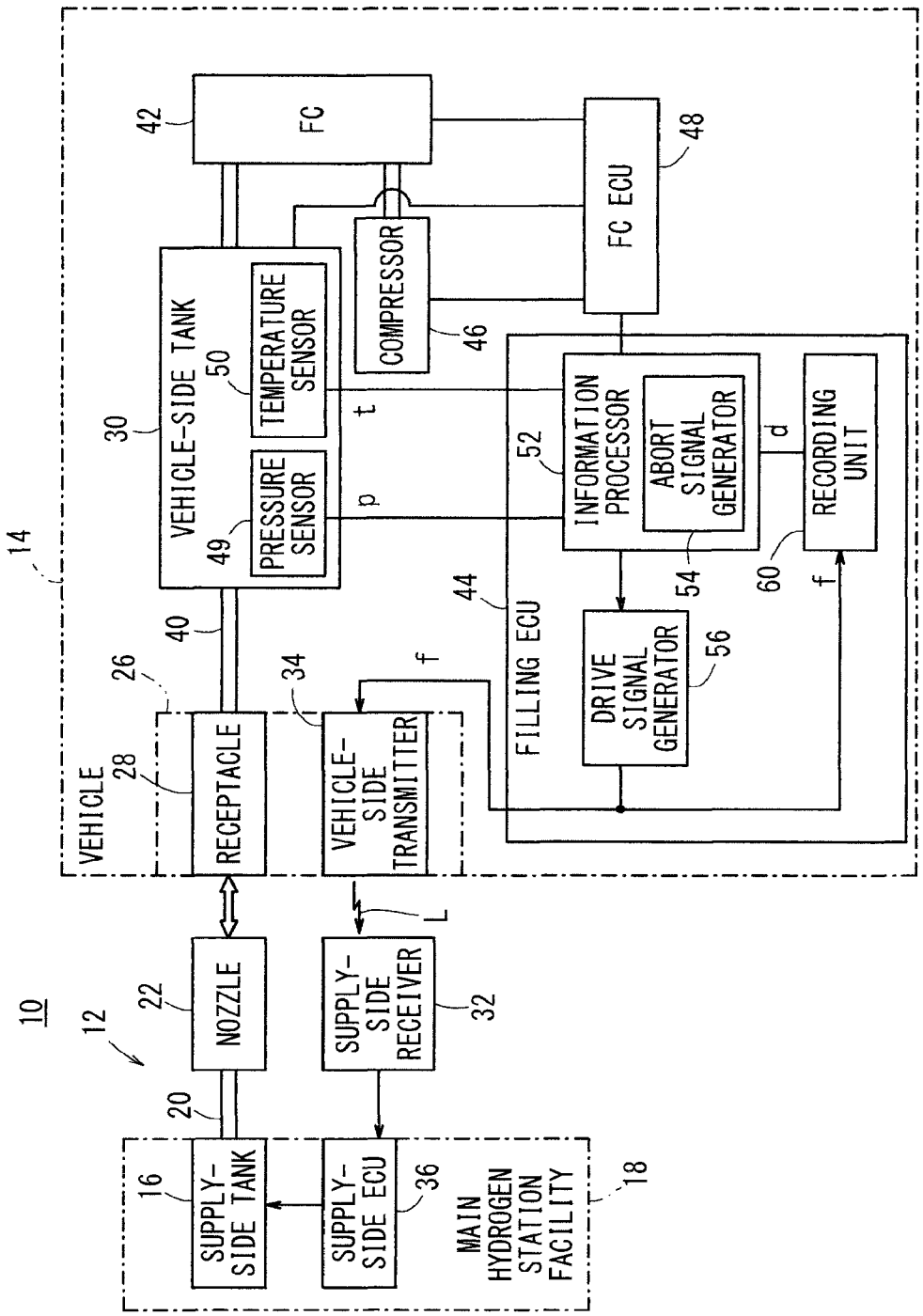
FIG. 1 is a functional block diagram of a communication filling system for supplying a fuel gas to a fuel cell system according to a first embodiment of the present invention.

FIG. 1 is a functional block diagram of a communication filling system 10 including a hydrogen station 12 as an external fuel supply source, and a fuel cell vehicle 14 (hereinafter also referred to as a "vehicle 14") according to a first embodiment of the present invention.

Figure 2:
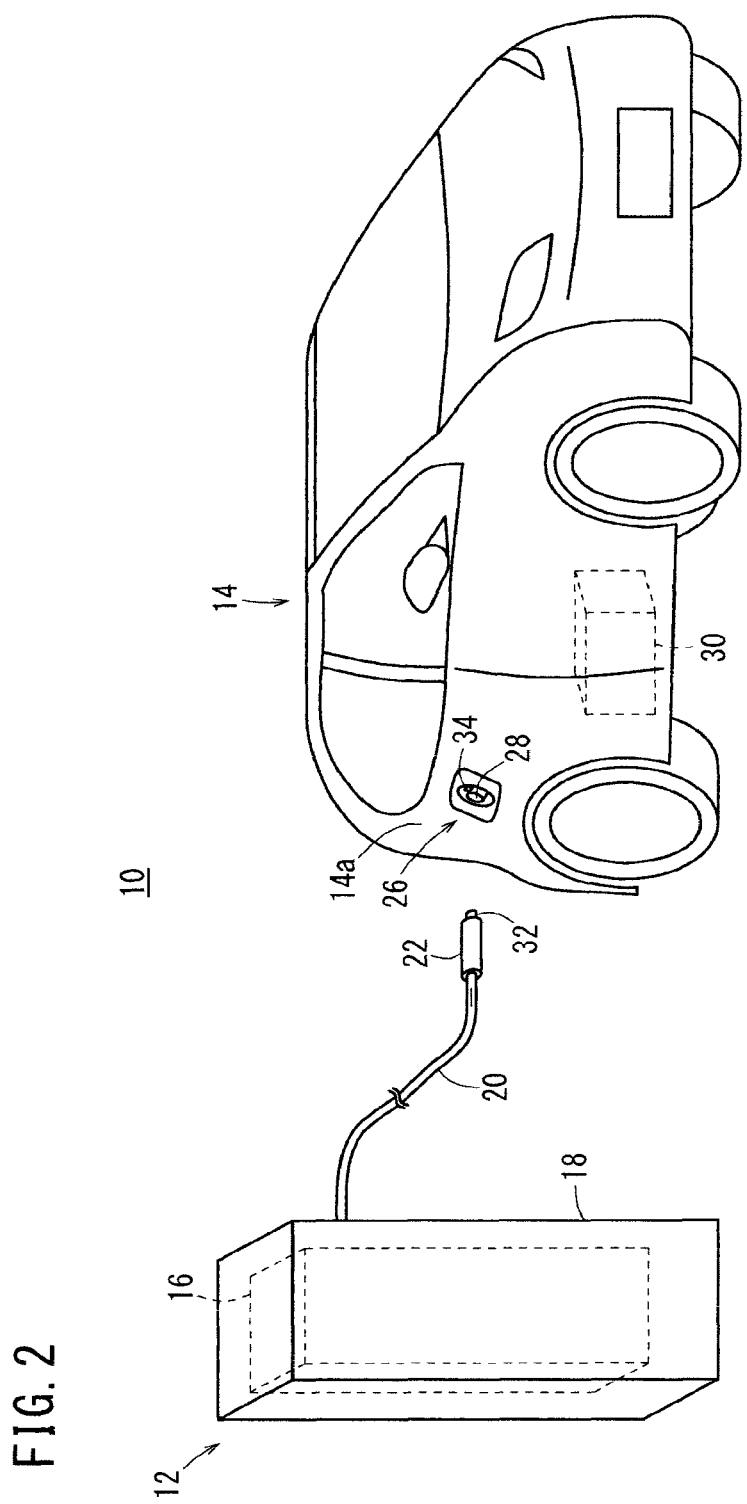
FIG. 2 is a schematic view of the communication filling system shown in FIG. 1.

FIG. 2 is a perspective view of the communication filling system 10 shown in FIG. 1.

The hydrogen station 12 is located adjacent to a road, similar to the case of a gas station, for example. The hydrogen station 12 enables a fuel gas (hydrogen gas) containing chemical energy to be supplied to the fuel cell vehicle 14. The hydrogen station 12 has a main hydrogen station facility 18 including a supply-side tank 16 (hydrogen tank) for storing the fuel gas, a hose 20 having an end connected to the supply-side tank 16, and a nozzle 22 (supply outlet) connected to the other end of the hose 20. The nozzle 22 is removably attached to a receptacle 28 (receiving vessel) of the vehicle 14 for filling the vehicle 14 with the fuel gas. While the nozzle 22 and the receptacle 28 are mechanically and electrically connected to each other, the hydrogen station 12 is operated according to a predetermined process in order to guide the fuel gas from the supply-side tank 16 through the hose 20 to the nozzle 22, and to fill the vehicle 14 with fuel gas from the nozzle 22.

The vehicle 14 that is connected to the hydrogen station 12 through the hose 20 carries a fuel cell 42 (hereinafter referred to as an "FC 42") therein, which generates electric energy by an electrochemical reaction between a fuel gas and an oxidizing gas, e.g., air. The vehicle 14 is propelled by the FC 42, which serves as a power source. The vehicle 14 has a vehicle body 14a that defines the appearance of the vehicle 14. A fuel introduction box 26 (housing unit) for introducing the fuel gas into the vehicle 14 is disposed on a side wall of the vehicle body 14a near a rear end thereof. The fuel introduction box 26 houses the receptacle 28 fixedly therein, in such a manner that the nozzle 22 can be connected to the receptacle 28.

The receptacle 28 is connected through a pipe 40 to a vehicle-side tank 30 (fuel storage unit) in the vehicle 14. For filling the vehicle-side tank 30 with fuel gas, the user or the like connects the nozzle 22 on the distal end of the hose 20 to the receptacle 28, thereby completing a gas passageway, i.e., a filling line, between the supply-side tank 16 and the vehicle-side tank 30.

A communication line between the hydrogen station 12 and the vehicle 14 is completed when a wireless communications link, by way of infrared communications or the like according to a predetermined protocol, is established between a supply-side receiver 32 on the distal end of the nozzle 22 and a vehicle-side transmitter 34 on an outer circumferential surface of the receptacle 28.

The main hydrogen station facility 18 also includes, in addition to the supply-side tank 16 and the other components described above, a supply-side ECU 36 (supply-side controller) for controlling the hydrogen station 12. The supply-side ECU 36 monitors the state of the fuel gas that is stored in the supply-side tank 16, detects the connected state of the vehicle 14 and the nozzle 22, and controls turning on and turning off of the fuel gas filling process. The supply-side ECU 36 also has a flow rate control function for recognizing (monitoring) characteristics and an internal state of the vehicle-side tank 30, and for controlling the amount of fuel gas supplied and the rate (filling rate) at which the fuel gas is supplied when the vehicle-side tank 30 is filled with the fuel gas.

As described above, the supply-side receiver 32 is mounted on the nozzle 22 of the hydrogen station 12. The supply-side receiver 32 is connected electrically to the supply-side ECU 36. The supply-side receiver 32 has a receiving device, which receives an infrared radiation pulse signal (pulse train) L transmitted from a transmitting device of the vehicle-side transmitter 34, and a non-illustrated electric circuit, which converts the received pulse signal into a current signal, converts the current signal into a voltage signal, amplifies the voltage signal, and sends the amplified voltage signal to the supply-side ECU 36. The transmitting device may comprise any of various devices capable of transmitting or emitting the infrared radiation pulse signal L, e.g., an infrared light-emitting diode (infrared LED). The receiving device may comprise any of various devices capable of detecting the infrared radiation pulse signal L, e.g., a photodiode (PD).

The vehicle 14 includes the vehicle-side tank 30, an FC (Fuel Cell) 42 connected to the vehicle-side tank 30 through a fuel gas passageway, a filling ECU 44 (filling controller) for monitoring the state of the fuel gas filled in the vehicle-side tank 30, and a fuel cell ECU 48 (hereinafter referred to as an "FCECU 48") for controlling the FC 42. The FCECU 48 serves as a main controller, which may also be referred to as a vehicle controller. The filling ECU 44 may also be referred to as an auxiliary controller. The FCECU 48 is capable of processing data at a rate higher than the filling ECU 44, and has a recording unit (memory) with a larger storage capacity than the filling ECU 44.

The filling ECU 44 and the FCECU 48 are capable of communicating with each other. The filling ECU 44 and the FCECU 48 each comprises a CPU, a memory, an interface, a timer, etc. Processing sequences according to predetermined programs are performed respectively in the filling ECU 44 and the FCECU 48.

The FC 42 comprises a stack of fuel cells. Under control of the FCECU 48, the FC 42 generates electrical energy based on a chemical reaction, which is carried out between the fuel gas supplied from the vehicle-side tank 30 and an oxidizing gas (compressed air) supplied from a compressor 46. The FC 42 supplies a direct current under a high DC voltage as generated electrical energy. The direct current from the FC 42 is converted into an alternating current by a non-illustrated inverter, the duty ratio of which is controlled by the FCECU 48. The alternating current from the inverter is supplied to a non-illustrated propulsive electric motor of the vehicle 14.

The vehicle-side tank 30 is combined with a pressure sensor 49 (storage internal state detector), which detects the pressure (gas pressure) in the vehicle-side tank 30 and supplies a pressure value p as a detection signal, and a temperature sensor 50 (storage internal state detector), which detects the temperature (gas temperature) in the vehicle-side tank 30 and supplies a temperature value t as a detection signal. The pressure sensor 49 and the temperature sensor 50 are electrically connected to the filling ECU 44, and transmit the detection signals representing the pressure value p and the temperature value t to the filling ECU 44.

The filling ECU 44 includes an information processor 52 for converting the pressure value p transmitted from the pressure sensor 49 and the temperature value t transmitted from the temperature sensor 50 into encoded data d, an abort signal generator 54 for generating an abort signal (stop signal) Sa based on the pressure value p, the temperature value t, and a state-of-charge value SOC calculated from the pressure value p and the temperature value t, a drive signal generator 56 for converting the encoded data d into a drive signal f for the vehicle-side transmitter 34, and a recording unit 60, which forms a portion of the memory of the filling ECU 44, for recording the encoded data d and/or the drive signal f in raw form, i.e., in an unprocessed condition.

The fuel introduction box 26 of the vehicle 14 functions as an introduction unit for connecting the vehicle 14 to the external hydrogen station 12 or the like. As described above, the fuel introduction box 26 houses the receptacle 28 and the vehicle-side transmitter 34 therein.

Normally, when filling of the vehicle-side tank 30 with the fuel gas is not being performed, the fuel introduction box 26 is closed by a non-illustrated lid. The non-illustrated lid is mechanically connected to a lid opener, not shown, which selectively opens and closes the lid. The lid opener is controlled for opening and closing the lid by the filling ECU 44. The fuel introduction box 26 is combined with a sensor, not shown, which detects the connected state of the nozzle 22 and the receptacle 28 and sends a detection signal to the filling ECU 44. The filling ECU 44 generates and outputs the drive signal f, which represents information concerning the temperature value t, the pressure value p, and the abort signal Sa.

Operations and Advantages of the First Embodiment

The vehicle 14, which serves as a fuel cell system according to the first embodiment, basically is configured as described above. Operations and advantages (including a processing sequence) of the vehicle 14 will be described below with reference to the flowchart shown in FIG. 3.

For filling the vehicle 14 with fuel gas, the operator or user of the vehicle 14 moves in close proximity to the hydrogen station 12, and opens a non-illustrated lid of the fuel introduction box 26 while the vehicle 14 is stopped without electrical energy being generated therein, i.e., while the FCECU 48 and the filling ECU 44 are in a stopped or sleeping state. The operator moves the nozzle 22 toward the projecting receptacle 28 in the fuel introduction box 26, so as to insert the receptacle 28 into the nozzle 22 and thereby fit the nozzle 22 over the receptacle 28. In this manner, when the nozzle 22 and the receptacle 28 are connected mechanically to each other, the vehicle-side transmitter 34 and the supply-side receiver 32 are spaced from each other or positioned with respect to each other so as to enable infrared communications to be carried out therebetween. Then in step S1, the filling ECU 44 is activated.

After the nozzle 22 and the receptacle 28 are connected to each other, and while the vehicle-side transmitter 34 and the supply-side receiver 32 are capable of sending and receiving signals to and from each other, the supply-side ECU 36 starts to fill the vehicle-side tank 30 of the vehicle 14 with fuel gas, based on the information represented by the drive signal f from the filling ECU 44. In other words, a fuel gas filling process is initiated.

Fuel gas is supplied from the supply-side tank 16 through the hose 20 to the nozzle 22, from which the fuel gas flows into the receptacle 28. Thereafter, the fuel gas is supplied from the receptacle 28 through the pipe 40 to the vehicle-side tank 30 in which the fuel gas is stored.

The vehicle-side tank 30 is supplied continuously with the fuel gas until the fuel gas reaches a certain level, e.g., until the fuel gas in the vehicle-side tank 30 reaches a gas pressure of 35 [MPa]. When the vehicle-side tank 30 is filled with fuel gas, the pressure in the vehicle-side tank 30 increases and the temperature therein also rises.

In order to monitor the pressure and temperature in the vehicle-side tank 30, in step S2, the pressure sensor 49 and the temperature sensor 50 in the vehicle-side tank 30 measure or detect the pressure and temperature in the vehicle-side tank 30 at each predetermined time interval T, and supply the detected pressure and temperature as a pressure value p and a temperature value t to the filling ECU 44.

In step S3, based on the pressure value p supplied from the pressure sensor 49 and the temperature value t supplied from the temperature sensor 50, the information processor 52 of the filling ECU 44 generates encoded data d, which represent the pressure value p and the temperature value t, etc., and which are supplied as output data. The encoded data d may also include a state-of-charge value SOC.

In step S4, the abort signal generator 54 determines whether or not a failure has occurred based on whether the pressure value p and the temperature value t, etc., represented by the encoded data d exceed respective threshold values.

In an initial cycle in step S4, the abort signal generator 54 judges that a failure has not occurred (step S4: NO), and in step S4R, the information processor 52 resets a failure flag Fa. Then, in step S5, the information processor 52 sends the pressure value p and the temperature value t, etc., represented by the encoded data d to the drive signal generator 56. The drive signal generator 56 generates a drive signal f including the pressure value p and the temperature value t, etc., and outputs the generated drive signal f.

Figure 4:
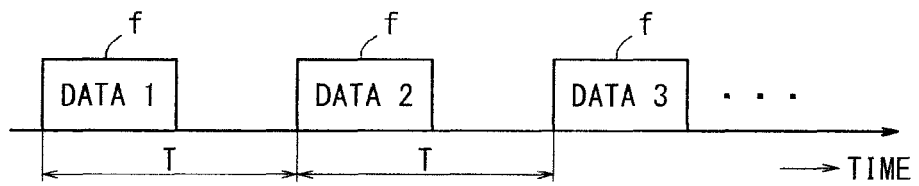
FIG. 4 is a diagram showing a drive signal comprising a pulse train.

FIG. 4 shows by way of example the drive signal f, which comprises a train of pulses, i.e., on and off levels, e.g., binary levels of 5 [V] and 0 [V], which are supplied from the drive signal generator 56. The respective pulses of the drive signal f are generated and supplied at each predetermined time interval T, which may be constant or variable. The drive signal f includes data 1, 2, 3, . . . as pulses, each of which contains information concerning the characteristics of the vehicle-side tank 30, the pressure value p, the temperature t, etc. The data 2 and the data subsequent thereto need not necessarily contain the characteristics of the vehicle-side tank 30.

After the drive signal f is generated in step S5, in step S6, the filling ECU 44 judges whether or not the failure flag Fa has been set (or reset). If the failure flag Fa has not been set, i.e., if a failure has not occurred (step S6: NO), then in step S7, the drive signal f supplied from the drive signal generator 56 is supplied to the vehicle-side transmitter 34, which turns on and off the transmitting device based on the on and off levels of the drive signal f, which in turn causes emission of an infrared radiation pulse signal L as a train of pulses, i.e., on and off binary levels, to the supply-side receiver 32. The receiving device of the supply-side receiver 32 detects the infrared radiation pulse signal L, which is representative of the drive signal f, and transmits the drive signal f to the supply-side ECU 36.

Based on the received drive signal f, which represents the characteristics of the vehicle-side tank 30, the pressure value p, and the temperature t, etc., the supply-side ECU 36 adjusts the amount of supplied fuel gas and the rate (filling rate) at which the fuel gas is supplied when the vehicle-side tank 30 starts to be filled with the fuel gas, as well as the amount of supplied fuel gas and the rate (filling rate) at which the fuel gas is supplied during the time that the vehicle-side tank 30 is being filled with the fuel gas. In this manner, the supply-side tank 16 is capable of supplying the fuel gas depending on the characteristics and state of the vehicle-side tank 30, thus making it possible to fill the vehicle-side tank 30 efficiently with the fuel gas.

In step S8, the filling ECU 44 judges whether or not the fuel gas filling process is finished. The answer to step S8 is affirmative (step S8: YES) when the vehicle-side tank 30 has been completely filled or if an unadjustable failure has occurred. If the fuel gas filling process is finished, then in step S9, the filling ECU 44 is shut down, and the processing sequence is brought to an end. The process carried out from step S2 to step S8: NO (i.e., steps S2, S3, S4: NO, steps S4R, S5, S6: NO, and steps S7, S8: NO) is repeated at each predetermined time interval T, e.g., 100 [ms], until the answer to step S8 becomes affirmative.

While the process from step S2 to step S8: NO is repeated, if the answer to step S4 is affirmative (step S4: YES), then in step S4A, the information processor 52 sets the failure flag Fa, and the abort signal generator 54 generates the abort signal Sa and the encoded data d that includes the abort signal Sa encoded therein.

The abort signal generator 54 generates the abort signal Sa if the temperature value t in the vehicle-side tank 30 becomes equal to or higher than a predetermined value, if the pressure value p in the vehicle-side tank 30 becomes equal to or higher than a predetermined value, or if the state-of-charge value SOC, which is calculated from the temperature value t and the pressure value p, becomes equal to or higher than a predetermined value. Accordingly, the abort signal Sa, which is generated in the foregoing manner, includes information therein concerning the occurrence of the failure.

When the abort signal Sa is generated, then in step S4B, the information processor 52 records in the recording unit 60 the pressure value p and the temperature value t, which are represented by the encoded data d generated in step S3 at the time that the answer to step S4 is affirmative. Further, at this time, the information processor 52 may also record the state-of-charge value SOC in the recording unit 60.

In step S5, after step S4B, the information processor 52 sends the pressure value p, the temperature value t, and the abort signal Sa represented by the encoded data d, which are indicative of a failure, to the drive signal generator 56, which generates a drive signal f comprising a train of pulses, i.e., on and off binary levels including the pressure value p and the temperature value t, and the abort signal Sa encoded therein, and supplies the generated drive signal f.

Since the answer to step S6, by which it is judged whether or not the failure flag Fa has been set, is affirmative (step S6: YES), i.e., since the failure flag Fa was set in step S4A, then in step S6A, the drive signal f supplied from the drive signal generator 56 is recorded in the recording unit 60 in synchronism with, i.e., in relation to, the encoded data d.

In step S7, the drive signal generator 56 supplies the drive signal f representing the encoded data d (i.e., the pressure value p, the temperature value t, and the abort signal Sa), which are judged as indicating a failure, to the vehicle-side transmitter 34. The vehicle-side transmitter 34 sends an infrared radiation pulse signal L, which is representative of the drive signal, to the supply-side receiver 32. The supply-side receiver 32 receives the drive signal f by detecting the infrared radiation pulse signal L from the vehicle-side transmitter 34, decodes the encoded data d into the pressure value p, the temperature value t, and the abort signal Sa, and transmits the pressure value p, the temperature value t, and the abort signal Sa to the supply-side ECU 36.

Based on the drive signal f (i.e., the pressure value p, the temperature value t, and the abort signal Sa decoded from the encoded data d that was judged as indicating a failure), the supply-side ECU 36 adjusts the amount of supplied fuel gas and the rate (filling rate) at which the fuel gas is supplied at the time that the vehicle-side tank 30 is filled with the fuel gas. For example, if the detected temperature value t is in excess of the predetermined (threshold) value, then the supply-side ECU 36 reduces the flow rate of the fuel gas, or cancels the fuel gas filling process.

After the answer to step S4 becomes affirmative (step S4: YES), the filling ECU 44 repeats the process from step S2 to step S8: NO (steps S2, S3, S4: YES, steps S4A, S4B, S5, S6: YES, and steps S6A, S7, S8: NO) once or a plurality of times. If the answer to step S4 does not become negative (step S4: NO), i.e., if the failure is not eliminated, then the answer to step S8 is made affirmative (step S8: YES) while the above process is repeated, and in step S9, the fuel gas filling process performed by the filling ECU 44 is stopped.

When the fuel gas filling process is stopped due to the occurrence of a failure, a warning preferably is given to the user by way of speech, an image, or the like in order for the user to make a judgment.

As described above, the fuel cell vehicle 14, which serves as a fuel cell system according to the first embodiment, includes the FC 42, the vehicle-side tank 30 as a fuel storage unit for storing a fuel gas that is supplied to the FC 42, the pressure sensor 49 and the temperature sensor 50, which serve as a storage internal state detector for detecting the pressure value p and the temperature value t as an internal state of the vehicle-side tank 30, the vehicle-side transmitter 34, which sends the drive signal f as a signal related to a fuel gas filling process by way of the infrared radiation pulse signal L to the supply-side receiver 32 of the external hydrogen station 12 during the time that the external hydrogen station 12 fills the vehicle-side tank 30 with the fuel gas, and the filling ECU 44, which serves as a filling controller. The filling ECU 44 includes the information processor 52, which is supplied with the pressure value p and the temperature value t as detected values detected by the pressure sensor 49 and the temperature sensor 50, and the filling ECU 44 processes information that is sent to the supply-side receiver 32 based on the pressure value p and the temperature value t. The filling ECU 44 further includes the drive signal generator 56 for converting the encoded data d processed by the information processor 52 into the drive signal f for the vehicle-side transmitter 34.

The filling ECU 44 includes the recording unit 60, which records the encoded data d processed by the information processor 52 and the drive signal f generated by the drive signal generator 56.

In the event of the occurrence of a filling failure (step S4: YES), it is possible to reliably judge whether the filling failure was caused by a failure of a command from the fuel cell vehicle 14 or a failure of the hydrogen station 12, by judging whether or not there is a failure in the information represented by the encoded data d as a signal related to the fuel gas filling process, which are sent from the fuel cell vehicle 14 to the external hydrogen station 12, and the drive signal f, which is closer to raw data, comprising a train of pulses, i.e., on and off binary levels, of the infrared radiation pulse signal L, based on the data recorded in the recording unit 60. Therefore, it is possible to verify the location of the filling failure.

Figure 3:
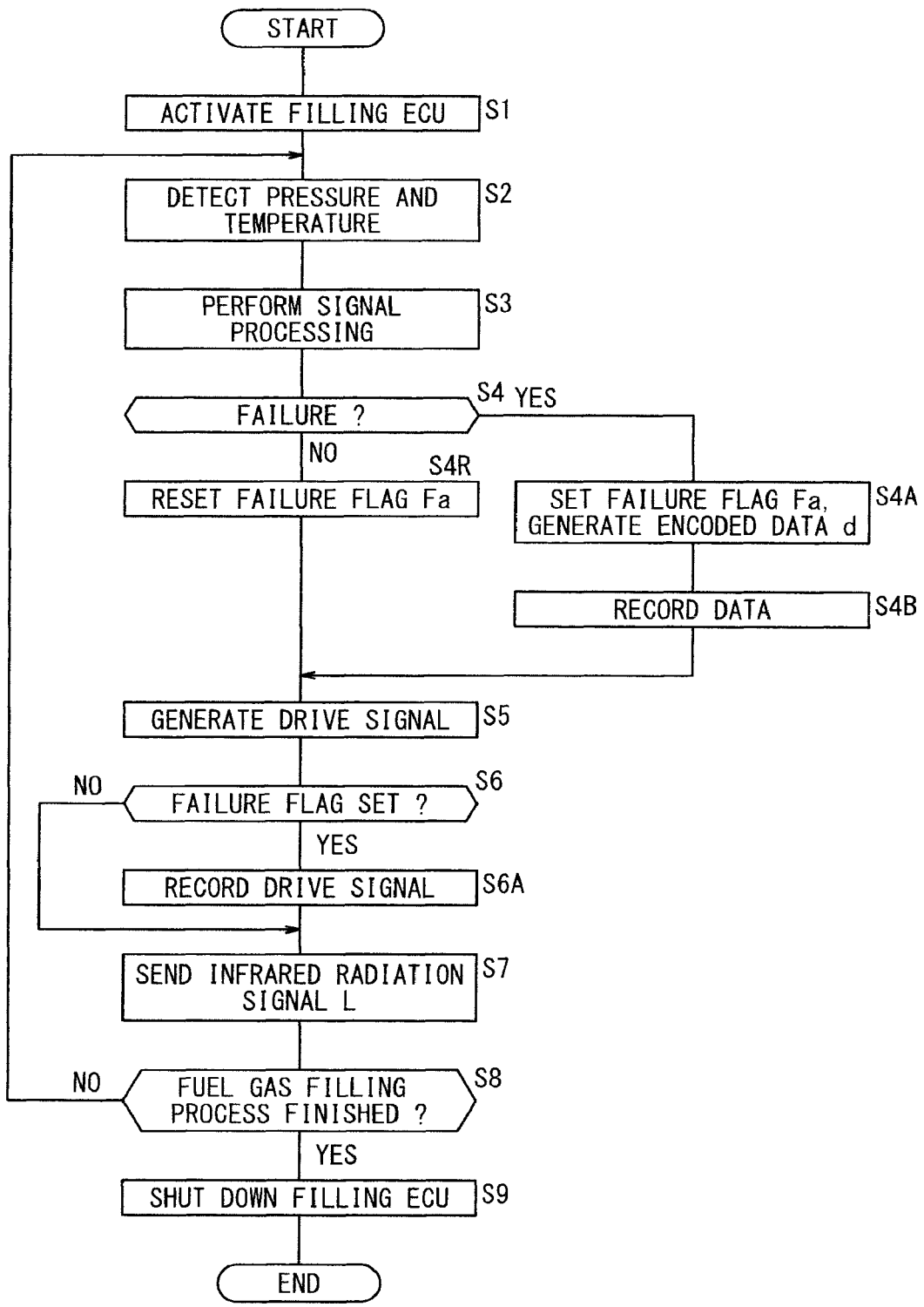
FIG. 3 is a flowchart of a processing sequence of the fuel cell system according to the first embodiment of the present invention.

During the processing sequence according to the flowchart shown in FIG. 3, the filling ECU 44 records the encoded data d and the drive signal f in the recording unit 60 only if the filling ECU 44 detects a filling failure (step S4: YES and step S6: YES). Therefore, the storage unit (memory) of the recording unit 60 can have a small storage capacity.

Modification of the First Embodiment and Operations and Advantages Thereof

Figure 5:
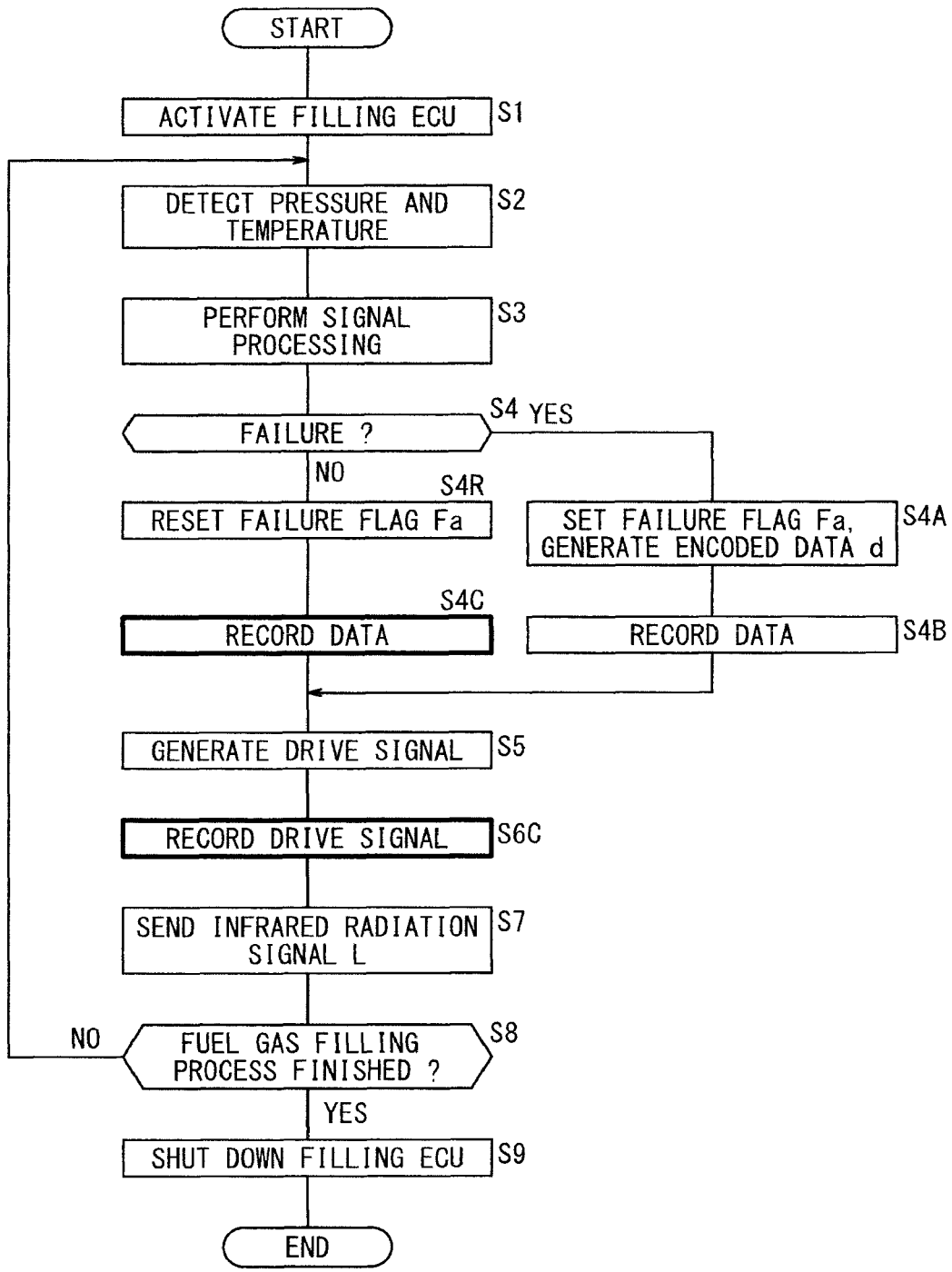
FIG. 5 is a flowchart of a processing sequence, which is carried out in a modification of the fuel cell system according to the first embodiment of the present invention.

FIG. 5 is a flowchart of a processing sequence of a modification of the fuel cell vehicle 14 according to the first embodiment of the present invention. This modification is designed to verify and analyze the location of a filling failure more accurately and in greater detail, i.e., to increase the reliability of the verification process.

According to the modification of the fuel cell vehicle 14, even if a failure has not occurred as a result of the failure judging process in step S4 (step S4: NO), then in step S4C, the pressure value p and the temperature value t of the encoded data d are recorded in the recording unit 60. Regardless of the result of the failure judging process in step S4, in step S6C, the drive signal f supplied from the drive signal generator 56 in step S5 is recorded in the recording unit 60 in synchronism with the encoded data d that was recorded in steps S4B and S4C.

Figure 6:
FIG. 6 is a comparison table, which illustrates qualitatively a relationship between the content of log data recorded in a recording unit and the verification reliability thereof.

FIG. 6 is a comparison table 100, which qualitatively illustrates the relationship between the content of the data recorded in the recording unit 60, i.e., the log data, and the verification reliability thereof. The content of the log data recorded in the recording unit 60 may be changed in such a way that at least one of the encoded data d processed by the information processor 52 and the drive signal f generated by the drive signal generator 56 is recorded in the recording unit 60. For example, if the process of recording the drive signal f, which is carried out in step S6C of the flowchart shown in FIG. 5, is omitted, then in steps S4B and S4C, only the encoded data d are recorded in the recording unit 60. Further, if the process of recording the encoded data d, which is carried out in steps S4B and S4C, is omitted, then in step S6C, only the drive signal f is recorded in the recording unit 60.

In the comparison table 100, according to a first proposal, only the drive signal f corresponding to the raw data of the transmitted train of pulses is recorded. According to a second proposal, only the encoded data d are recorded. According to a third proposal, both the drive signal f and the encoded data d are recorded.

According to the first proposal, the drive signal f is recorded as data in compliance with infrared communications standards. According to the second proposal, the encoded data d are recorded in a freely selectable data format. According to the third proposal, the drive signal f and the encoded data d are recorded with high redundancy.

It is possible to determine with high reliability whether a failure has occurred in the vehicle 14 or the hydrogen station 12 by verifying the content of the drive signal f, which is made up of data in compliance with infrared communications standards, the data being recorded in the recording unit 60. The first through third proposals may be made available in a selectable manner.

Figure 7:
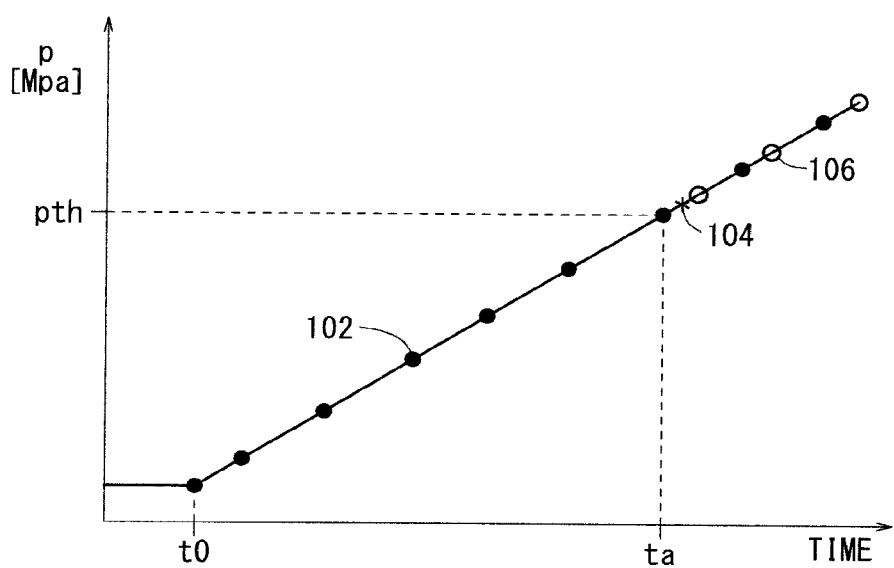
FIG. 7 is a graph illustrating various recording timings at which data is recorded.

FIG. 7 is a graph illustrating various recording timings at which data is recorded. It is assumed that the vehicle-side tank 30 starts to be filled at time t0, whereas a failure occurs and the abort signal Sa is generated at time ta. The horizontal axis of the graph represents time, and the vertical axis represents the pressure value p, for example. The vertical axis may alternatively represent the temperature value t or the state-of-charge value SOC.

The timings 102 indicated by the solid dots show that after the vehicle-side tank 30 starts to be filled at time t0, data are recorded at certain time intervals, e.g., at the above-described time intervals T, and data also are recorded at certain time intervals after the failure has occurred at time ta, i.e., after the abort signal Sa has been generated. Although the size of the recorded data is large, the data, which are recorded at the timings 102, increases the reliability of the verification process.

The timing 104 indicated by the asterisk shows that data are recorded only once after the failure has occurred at time ta. Thus, although the size of the recorded data is small, the verification process remains acceptable.

The timings 106 indicated by the circles show that data are recorded a plurality of times after the failure has occurred at time ta. In this case, although the size of the recorded data is relatively small, the data recorded at the timings 106 increase the reliability of the verification process.

If data are recorded cyclically on a first-in first-out basis over a certain period of time, e.g., over a period of time that is long enough to generate data in a range from several data to several tens of data, then if a failure occurs at time ta, it is possible to record data in a range from several data to several tens of data that take place across the time ta. Therefore, the recorded data makes the above-described second verification process most reliable after the data are recorded at the timings 102. At the same time, the size of the recorded data remains relatively small.

The timings 102, 104, and 106, recording of the cyclical data, the number of data recorded thereby, and the recording time intervals may be made available in a selectable manner. Such data may be recorded in connection with date and time information, as will be described later.

Second Embodiment

The above-described filling ECU 44 is an ECU that is dedicated to carrying out filling of the vehicle-side tank 30 with fuel gas when the vehicle 14 is at rest, i.e., at a time that the FC 42 has stopped generating electric energy. Therefore, the storage capacity of the recording unit 60, i.e., the memory capacity, is relatively small. If the memory capacity is increased, then the cost of the filling ECU 44 is increased. According to the second embodiment, the FCECU 48 of the vehicle 14, which has a relatively large memory capacity, is used as a recording controller. Components of the invention and flowchart steps according to the second embodiment, which are identical to those described above according to the first embodiment, are denoted by identical reference characters, and such features will not be described in detail below.

Figure 8:
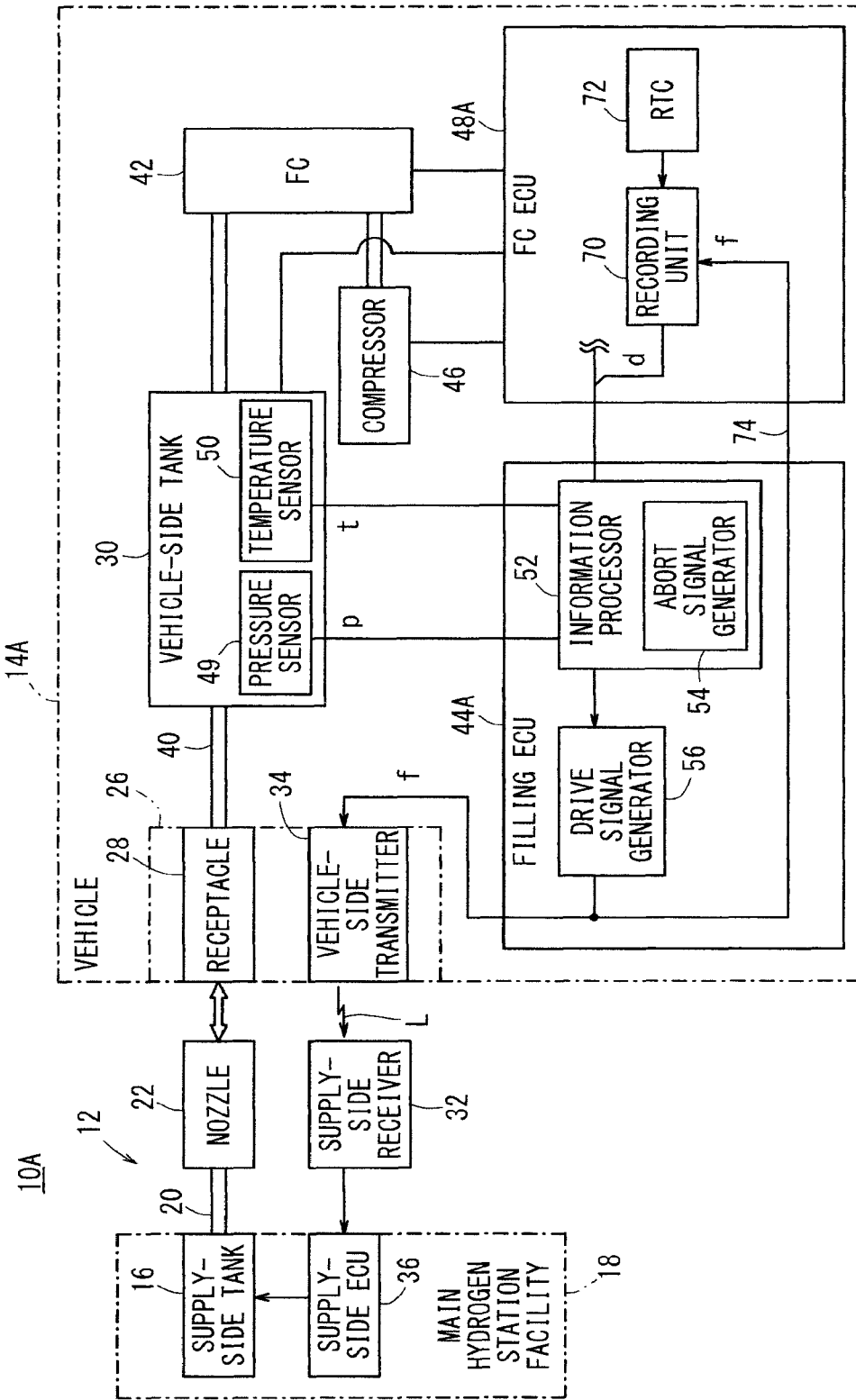
FIG. 8 is a functional block diagram of a communication filling system for supplying a fuel gas to a fuel cell system according to a second embodiment of the present invention.

FIG. 8 is a functional block diagram of a communication filling system 10A including a hydrogen station 12 as an external fuel supply source, and a fuel cell vehicle 14A (hereinafter also referred to as a "vehicle 14A") as a fuel cell system according to the second embodiment of the present invention.

As shown in FIG. 8, the vehicle 14A includes a filling ECU 44A and an FCECU 48A, which are provided in place of the filling ECU 44 and the FCECU 48 shown in FIG. 1 according to the first embodiment.

The drive signal f generated by the drive signal generator 56 of the filling ECU 44A is supplied through a branch line 74 from an output terminal of the drive signal generator 56 to a recording unit 70 of the FCECU 48A.

The FCECU 48A, which is a high-functionality ECU, comprises a realtime clock (RTC) 72, which operates as a time manager for managing time (year, month, date, hour, minute, second). In other words, the FCECU 48A includes a time managing function.

The recording unit 70 of the FCECU 48A records therein the encoded data d and/or the drive signal f in synchronism with the time (year, month, date, hour, minute, second) managed by the RTC 72.

Operations and Advantages of the Second Embodiment

Figure 9:
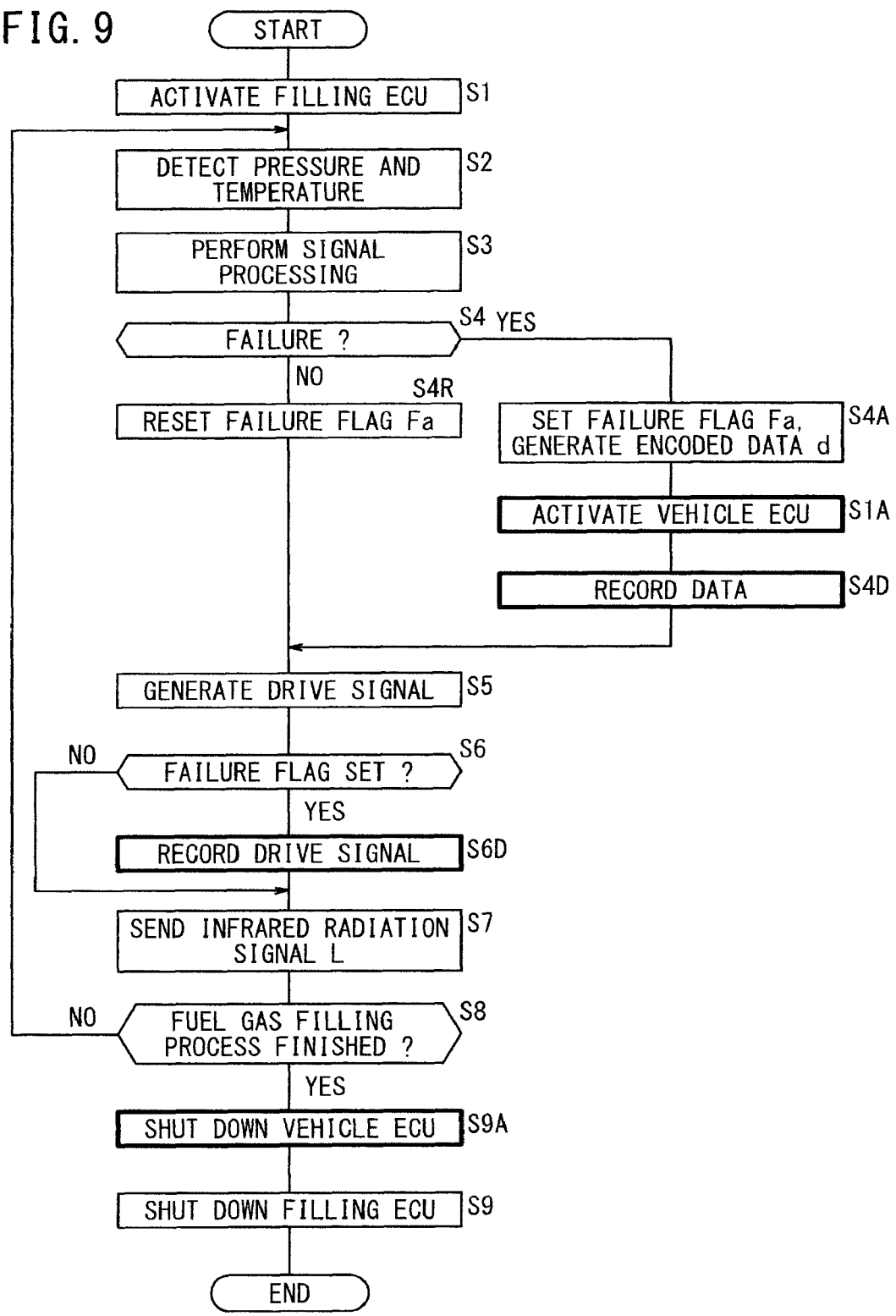
FIG. 9 is a flowchart of a processing sequence of the fuel cell system according to the second embodiment of the present invention.

The vehicle 14A, which serves as a fuel cell system according to the second embodiment, basically is configured as described above. Operations and advantages of the vehicle 14A will be described below with reference to the flowchart shown in FIG. 9 alongside of the flowchart of FIG. 3. FIG. 9 is a flowchart of a processing sequence of the fuel cell system according to the second embodiment of the present invention.

According to the processing sequence of the flowchart shown in FIG. 9, unlike the processing sequence of the flowchart shown in FIG. 3, if the answer to step S4 is affirmative (step S4: YES), then the information processor 52 sets the failure flag Fa. In addition, in step S4A, the information processor 52 generates an abort signal Sa together with encoded data d including the abort signal Sa.

In the next step S1A, the FCECU 48A, which is a vehicle ECU in a sleeping state, is activated by the filling ECU 44A. When the abort signal Sa is generated and if the answer to step S4 is affirmative, then in step S4D, the information processor 52 of the filling ECU 44A requests that the FCECU 48A record in the recording unit 70 the pressure value p and the temperature value t of the encoded data d that was generated in step S3. In response to such a request, the FCECU 48A also reads the time information from the RTC 72, and records the encoded data d in synchronism with the time information in the recording unit 70.

Since the answer to step S6, by which it is judged whether or not the failure flag Fa has been set, is affirmative (step S6: YES), the drive signal f supplied from the drive signal generator 56 of the filling ECU 44A is supplied through the branch line 74 to the FCECU 48A, and in step S6D, the drive signal f is recorded in the recording unit 70 as raw data made up of a train of pulses, in synchronism with or in relation to the encoded data d and the time information.

After the answer to step S4 becomes affirmative (step S4: YES), the filling ECU 44A repeats the process from step S2 to step S8: NO (steps S2, S3, S4: YES, steps S4A, S1A, S4D, S5, S6: YES, and steps S6D, S7, S8: NO) once or a plurality of times. If the answer to step S4 does not become negative (step S4: NO), i.e., if the failure is not eliminated while the above process is repeated, then in step S9A, the FCECU 48A, which serves as the vehicle ECU, is shut down, and in step S9, the filling ECU 44A, which has performed the fuel gas filling process, is shut down.

When the fuel gas filling process is stopped due to the occurrence of a failure, a warning preferably is given to the user by way of speech, an image, or the like, to thereby enable the user to make a judgment.

As described above, the fuel cell vehicle 14A, which serves as a fuel cell system according to the second embodiment, includes the FC 42, the vehicle-side tank 30 as a fuel storage unit for storing a fuel gas that is supplied to the FC 42, the pressure sensor 49 and the temperature sensor 50, which serve as a storage internal state detector for detecting the pressure value p and the temperature value t as an internal state of the vehicle-side tank 30, the vehicle-side transmitter 34, which sends the drive signal f as a signal related to a fuel gas filling process to the supply-side receiver 32 of the external hydrogen station 12 when the external hydrogen station 12 fills the vehicle-side tank 30 with the fuel gas, and the filling ECU 44A, which serves as a filling controller. The filling ECU 44A includes the information processor 52, which is supplied with the pressure value p and the temperature value t as detected values detected by the pressure sensor 49 and the temperature sensor 50. The filling ECU 44A processes information that is sent to the supply-side receiver 32 based on the pressure value p and the temperature value t. The filling ECU 44A further includes the drive signal generator 56 for converting the encoded data d processed by the information processor 52 into the drive signal f for the vehicle-side transmitter 34. The fuel cell vehicle 14A according to the second embodiment also includes the FCECU 48A, which serves as a recording controller for recording in the recording unit 70 the encoded data d processed by the information processor 52 of the filling ECU 44A, and the drive signal f generated by the drive signal generator 56 of the filling ECU 44A.

In addition to the advantages described above with respect to the first embodiment, the second embodiment also offers the advantage that the recording unit 60 can be eliminated from the filling ECU 44A, thereby reducing the size and cost of the filling ECU 44A.

The FCECU 48A, which serves as the recording controller, is a high-level ECU as a vehicle ECU, which includes a time grasping function based on the RTC 72. The FCECU 48A can record the encoded data d and the drive signal f in relation to time in the recording unit 70, such that the recorded data are made highly reliable and verification of the recorded data is facilitated.

According to the second embodiment, similar to the case of the processing sequence according to the flowchart of the first embodiment shown in FIG. 3, the filling ECU 44A records the encoded data d and the drive signal f in the recording unit 70 only if the filling ECU 44A detects a filling failure (step S4: YES, step S6: YES). Therefore, the storage unit (memory) of the recording unit 70 can have a small storage capacity.

Modification of the Second Embodiment

Figure 10:
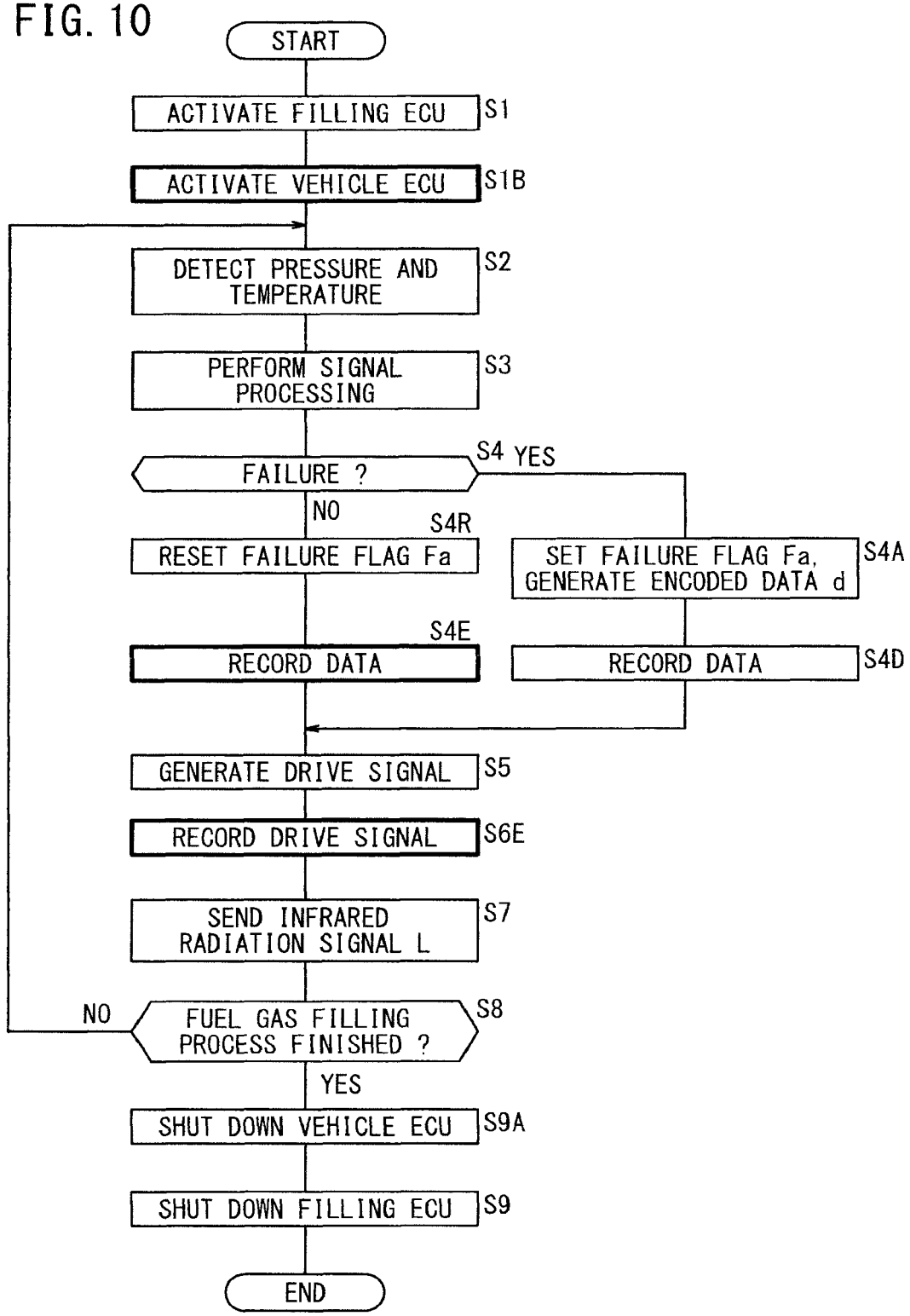
FIG. 10 is a flowchart of a processing sequence, which is carried out in a modification of the fuel cell system according to the second embodiment of the present invention.

FIG. 10 is a flowchart of a processing sequence, which is carried out in a modification of the fuel cell system according to the second embodiment of the present invention. With the fuel cell vehicle 14A according to the second embodiment, similar to the case of the processing sequence according to the flowchart shown in FIG. 5 in relation to the modification of the first embodiment, the filling ECU 44A is activated in step S1, and thereafter, the FCECU 48A, which serves as the vehicle ECU, is activated in step S1B.

Even if a failure has not occurred (step S4: NO) as a result of the failure judging process performed in step S4, in step S4E, the pressure value p and the temperature value t of the encoded data d are recorded in synchronism with time information in the recording unit 70 of the FCECU 48A. Regardless of the result of the failure judging process performed in step S4, in step S6E, the drive signal f supplied from the drive signal generator 56 in step S5 is recorded as a drive signal f made up of raw data in the recording unit 70 in synchronism with the encoded data d that is recorded in steps S4E and S4D.

The fuel cell vehicle 14A according to the second embodiment may employ any one of the first through third proposals described above with reference to the comparison table 100 shown in FIG. 6, and may also employ any one of the timings at which data is recorded, as described above with reference to FIG. 7. The first through third proposals and the timings at which data is recorded may also be employed in a similar manner in a third embodiment and a fourth embodiment, to be described below.

Third Embodiment and Operations and Advantages Thereof

According to the first embodiment and the second embodiment described above, the encoded data d and/or the drive signal f relative to the infrared radiation pulse signal L, which is transmitted from the vehicle-side transmitter 34 of the fuel cell vehicles 14, 14A to the supply-side receiver 32 of the hydrogen station 12 as an external fuel gas supply apparatus, is recorded in the recording units 60, 70. However, the drive signal f and/or the encoded data d relative to an infrared radiation pulse signal L, which is transmitted from a supply-side transmitter 82 of an external hydrogen station 12A to a vehicle-side receiver 84 of a fuel cell system, may be recorded in the recording units 60, 70.

Figure 11:
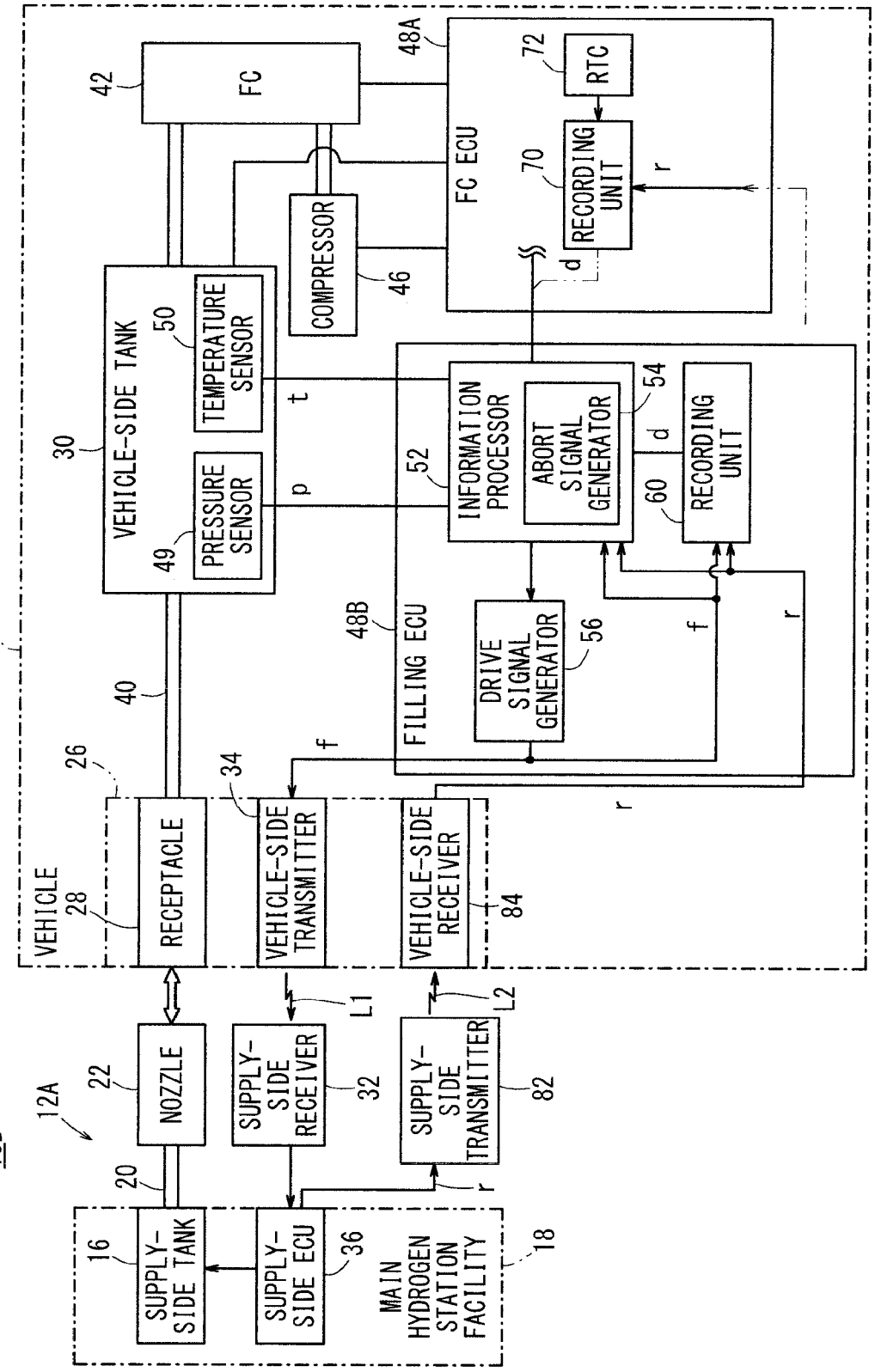
FIG. 11 is a functional block diagram of a communication filling system for supplying a fuel gas to a fuel cell system according to a third embodiment of the present invention.

FIG. 11 is a functional block diagram of a communication filling system 10B including a hydrogen station 12A, which serves as an external fuel supply source, and a fuel cell vehicle 14B (hereinafter also referred to as a "vehicle 14B"), which serves as a fuel cell system according to a third embodiment of the present invention.

The communication filling system 10B includes, in the hydrogen station 12A, which is provided external to the vehicle 14B and serves as a fuel supply apparatus for supplying a fuel gas to the vehicle-side tank 30, the supply-side receiver 32, which serves as a fuel-supply-side receiver for receiving a signal related to a fuel gas filling process sent from the vehicle-side transmitter 34 of the vehicle 14B, e.g., an infrared radiation pulse signal L1, and a supply-side transmitter 82, which serves as a fuel-supply-side transmitter for transmitting a signal related to the fuel gas filling process during the time that the fuel gas is supplied to the vehicle-side tank 30. The vehicle 14B has a vehicle-side receiver 84 for receiving a signal transmitted from the supply-side transmitter 82, e.g., an infrared radiation pulse signal L2, and a filling ECU 48B which records, in the recording unit 60, a drive signal r as a signal that is recorded and decoded by the vehicle-side receiver 84. The drive signal r is generated originally by the supply-side ECU 36. As indicated by the two-dot-and-dash line, the decoded drive signal r may be recorded in synchronism with time information in the recording unit 70 of the FCECU 48A, which serves as a recording controller.

In place of or in addition to recording of the drive signal r, which is equivalent to raw data of the infrared radiation signal L2, encoded data d generated by processing the drive signal r may be recorded in the recording unit 60 and/or the recording unit 70.

Figure 12:
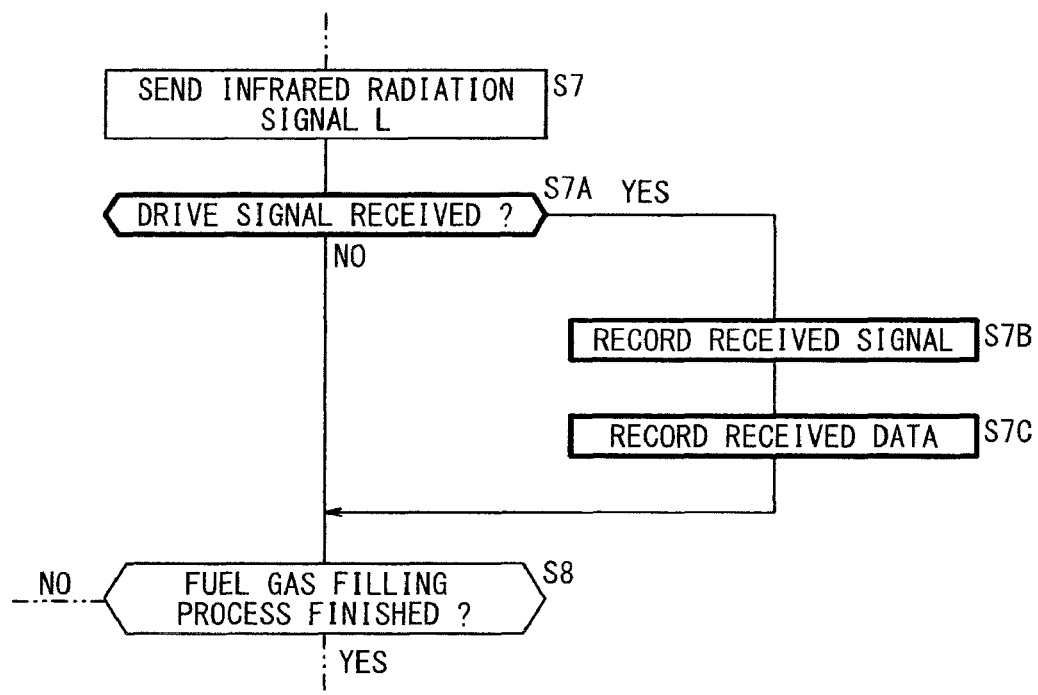
FIG. 12 is a flowchart of a portion of a processing sequence of the fuel cell system according to the third embodiment of the present invention.

FIG. 12 is a flowchart of a portion of a processing sequence of the fuel cell system according to the third embodiment of the present invention. As indicated by the flowchart shown in FIG. 12, an additional step S7A for judging whether or not the drive signal r has been received is added between step S7 and step S8 of the flowcharts shown in each of FIGS. 3, 5, 9, and 10. Further, if the vehicle-side receiver 84 has received and decoded the drive signal r (step S7A: YES), then in step S7B, the drive signal r is recorded in the recording units 60, 70, and in step S7C, the encoded data d, which is generated by processing the drive signal r with the information processor 52, is recorded in the recording units 60, 70.

With the vehicle 14B according to the third embodiment, the filling ECU 48B can record the signals transmitted from the supply-side transmitter 82 and received by the vehicle-side receiver 84, for example, the drive signal r as an infrared radiation signal L2 and/or the encoded data d, in the recording units 60, 70. Consequently, in the event of a filling failure, it is possible to accurately determine whether the filling failure has occurred in the fuel cell system or in the fuel supply apparatus. Therefore, it is possible to verify and analyze the location of the filling failure.

Fourth Embodiment

Each of the first through third embodiments described above is directed to a fuel cell system. However, in addition to such a fuel cell system, the present invention also is applicable to a fuel consumption system, e.g., a hydrogen engine vehicle or a CNG vehicle.

Figure 13:
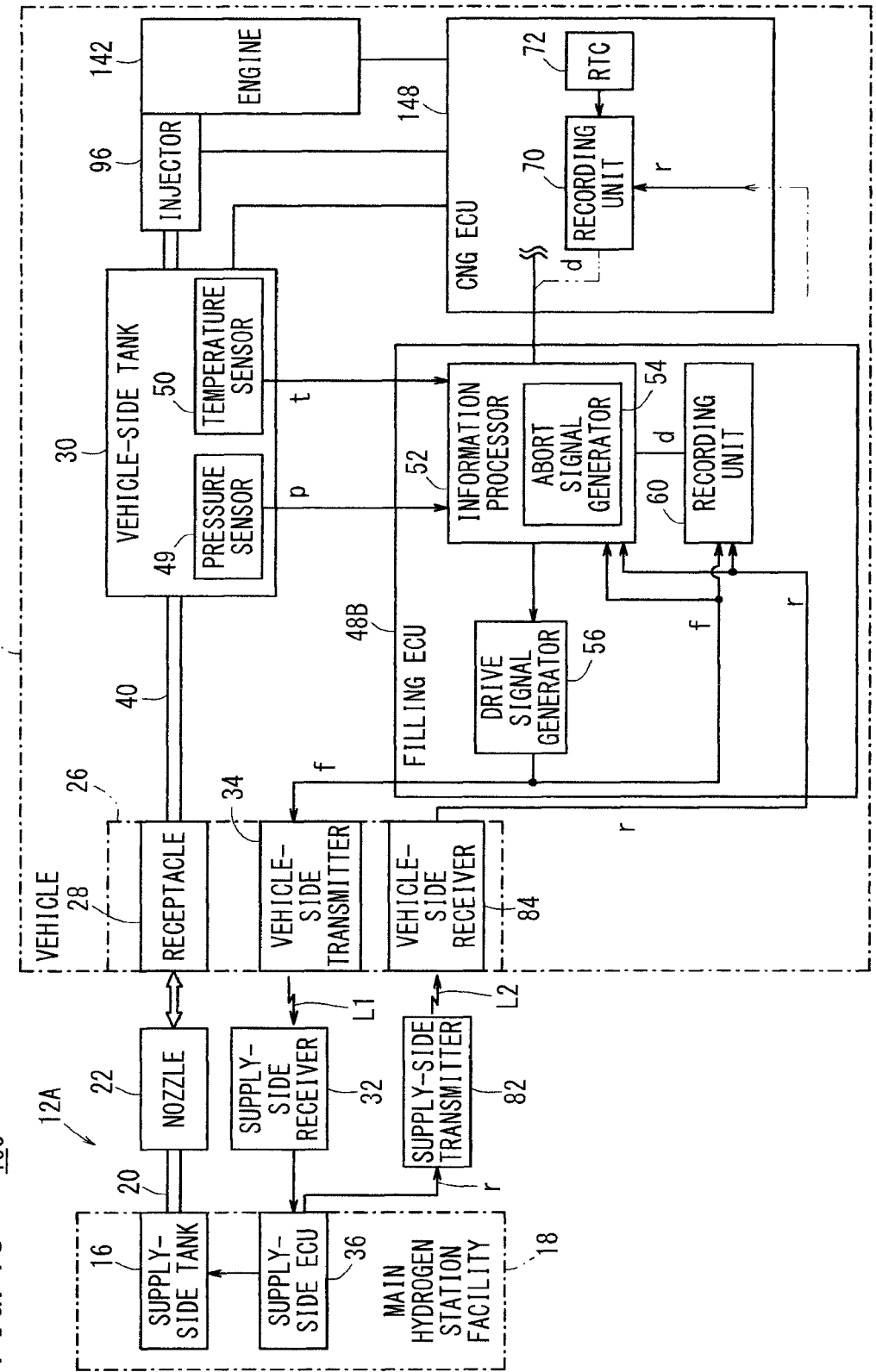
FIG. 13 is a functional block diagram of a communication filling system for supplying a fuel gas to a fuel cell system according to a fourth embodiment of the present invention.

FIG. 13 is a functional block diagram of a communication filling system 10C including the hydrogen station 12A, which serves as an external fuel supply source, and a CNG vehicle 14C (hereinafter also referred to as a "vehicle 14C"), which serves as a fuel consumption system according to a fourth embodiment of the present invention.

In the CNG vehicle 14C, natural gas is supplied from the vehicle-side tank 30 through a non-illustrated pressure reducing valve. The natural gas is injected from an injector 96 into an engine 142 under the control of a CNGECU 148. The CNGECU 148 includes the recording unit 70 and the RTC 72, similar to the case of the FCECU 48A shown in FIG. 11, for example.

The CNG vehicle 14C includes the engine 142, which operates as a fuel consumption apparatus, the vehicle-side tank 30, which serves as a fuel storage unit for storing a fuel gas that is supplied to the engine 142, the pressure sensor 49 and the temperature sensor 50, which function as storage internal state detectors for detecting the pressure value p and the temperature value t as an internal state of the vehicle-side tank 30, the vehicle-side transmitter 34 for sending signals related to the fuel gas filling process to the supply-side receiver 32 of the external hydrogen station 12A when the external hydrogen station 12A fills the vehicle-side tank 30 with the fuel gas, and the filling ECU 48B that operates as a controller. The filling ECU 48B includes the information processor 52, which is supplied with the pressure value p and the temperature value t as detected values detected by the pressure sensor 49 and the temperature sensor 50. The information processor 52 processes information that is sent to the supply-side receiver 32 based on the pressure value p and the temperature value t. The filling ECU 48B further includes the drive signal generator 56 for converting the encoded data d (the pressure value p, the temperature value t, and the abort signal Sa) processed by the information processor 52 into the drive signal f for the vehicle-side transmitter 34.

The filling ECU 48B includes the recording unit 60, in which there are recorded at least one of the encoded data d processed by the information processor 52 and the drive signal f generated by the drive signal generator 56.

The advantages that accrue from recording data in the recording units 60, 70 are the same as those of the first through third embodiments described above, and will not be described in detail below.

The present invention is not limited to the above embodiments. Various changes and modifications may be made to the embodiments based on the foregoing descriptions thereof. For example, the encoded data d and the drive signals r, f may be recorded in a recording unit such as the memory in the supply-side ECU 36 of the hydrogen stations 12, 12A.

While the invention has been particularly shown and described with reference to preferred embodiments, it will be understood that variations and modifications can be effected thereto by those skilled in the art without departing from the scope of the invention as defined by the appended claims.

What is claimed is:

1. A method of controlling a fuel storage system comprising a fuel storage unit for storing a fuel gas, a storage internal state detector for detecting an internal state of the fuel storage unit, and a transmitter for sending a signal related to a fuel gas filling process to an external fuel supply source when the external fuel supply source fills the fuel storage unit with the fuel gas, the method comprising the steps of:

processing information to be sent to the external fuel supply source, based on a detected temperature and pressure of the fuel storage unit by the storage internal state detector;

converting processed data into a drive signal for the transmitter;

recording the processed data and the drive signal; and transmitting the drive signal to the external fuel supply source triggering the external fuel supply source to, based on the drive signal, adjust an amount of fuel gas supplied to the fuel storage unit and a filling rate at which the fuel gas is supplied to the fuel storage unit.

2. The method according to claim 1, further comprising:

detecting a filling failure based on the detected temperature and pressure of the fuel storage unit; and recording the processed data and the drive signal once the filling failure has been detected.

3. The method according to claim 1, wherein the processed data and the drive signal are recorded in at least one of a recording unit of an information processor processing the information and a recording unit of a controller for controlling the fuel storage system.

4. The method according to claim 3, wherein the controller has a time grasping function, and records the processed data and the drive signal in the recording unit of the controller in relation to time.

5. The method according to claim 1, wherein the external fuel supply source includes:

a fuel supply apparatus for supplying the fuel gas to the fuel storage unit, the fuel supply apparatus having a fuel-supply-side receiver for receiving the signal related to the fuel gas filling process sent from the transmitter, wherein the transmitter is on the side of the fuel storage unit; and a fuel-supply-side transmitter combined with the fuel supply apparatus, for transmitting, to an exterior, a signal related to the fuel gas filling process when the fuel gas is supplied to the fuel storage unit;

wherein the fuel cell system further comprises a receiver for receiving the signal sent from the fuel-supply-side transmitter; and the signal sent from the fuel-supply-side transmitter and received by the receiver is recorded along with the processed data and the drive signal.

6. The method according to claim 1, wherein the fuel gas is supplied to a fuel cell.

7. The method according to claim 1, wherein the fuel gas is supplied to a fuel consumption apparatus.

* * * * *